United States Patent [19]
Lind

[11] 3,875,066
[45] Apr. 1, 1975

[54] SLUDGE SEPARATOR

[75] Inventor: J. Henric Lind, Solna, Sweden

[73] Assignee: Pdypur Forsaljnings AB, Sundbyberg, Sweden

[22] Filed: Jan. 7, 1974

[21] Appl. No.: 431,341

[52] U.S. Cl. ................................ 210/521, 210/532
[51] Int. Cl. ............................................. B01d 21/00
[58] Field of Search ........ 210/207, 513, 521, 532 R, 210/532 S

[56] References Cited
UNITED STATES PATENTS
2,911,102  11/1959  Cionchi ........................... 210/532 S FOREIGN PATENTS OR APPLICATIONS
| | | | |
|---|---|---|---|
| 503,336 | 7/1930 | Germany ............................. | 210/532 |
| 24,066 | 12/1892 | United Kingdom ............... | 210/532 |
| 704,804 | 5/1931 | France ................................. | 210/532 |
| 535,255 | 11/1955 | Italy ..................................... | 210/532 S |
| 524,577 | 4/1955 | Italy ..................................... | 210/532 S |
| 1,083,190 | 1/1956 | Germany ............................. | 210/532 |

*Primary Examiner*—Theodore A. Granger
*Attorney, Agent, or Firm*—William J. Daniel

[57] ABSTRACT

Sewage is admitted into a generally vertically arranged container having a coaxial inverted generaly frusto-conical partition above the admission point which divides the container into upper and lower chambers and collects the bulk of floating contaminants in the interior thereof. The partition is provided with peripheral slots at the lower edge of its skirt to return any sinking contaminants which may enter the upper chamber to the lower chamber and a tubular sleeve surrounds the upper end of the partition with clearance therebetween at its lower end to admit liquid into the annular space thus formed while excluding from such space buoyant contaminants. An outlet pipe extends from the interior of the annular space to the exterior of the container to discharge clear effluent therefrom.

4 Claims, 1 Drawing Figure

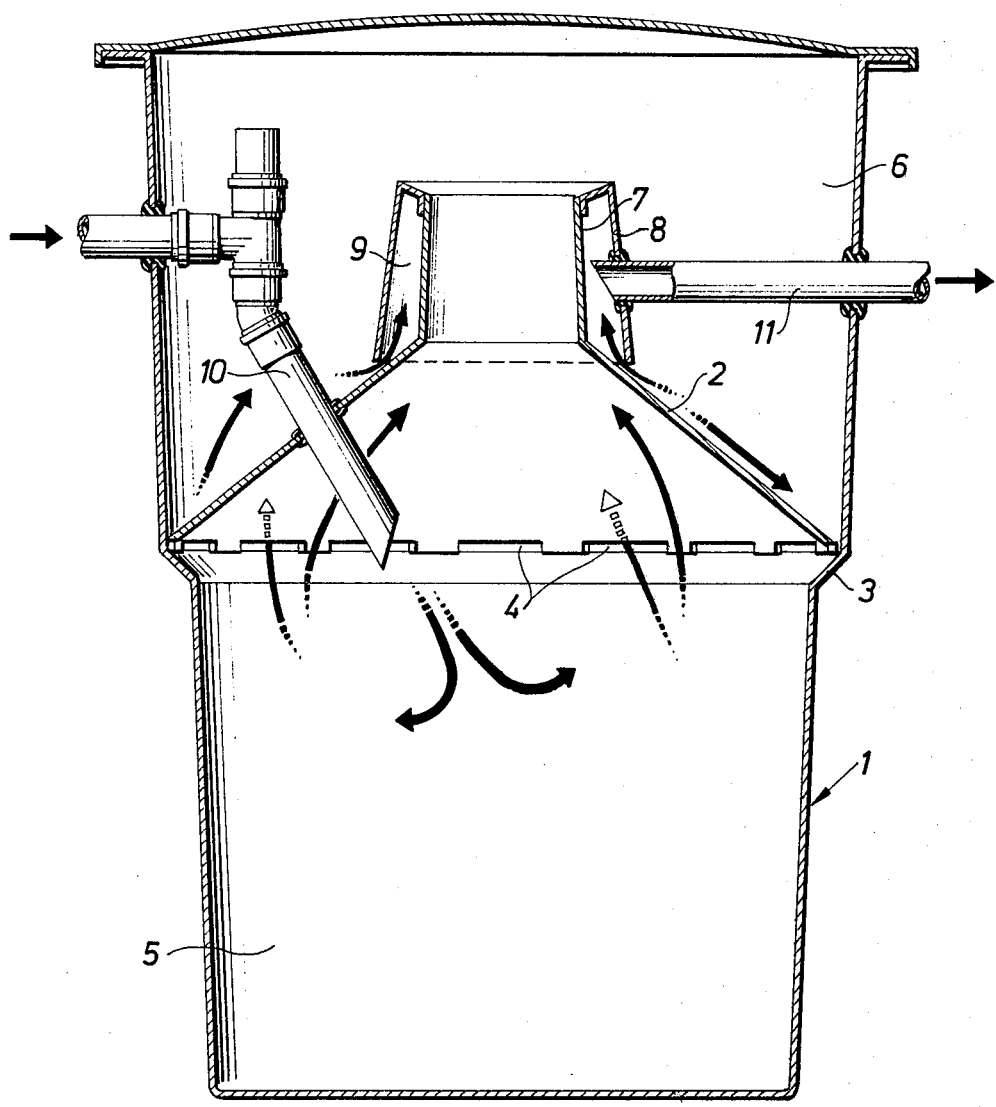

SLUDGE SEPARATOR

The present invention relates to an apparatus for removing sinking and floating contaminants from sewage, and particularly from domestic sewage, said apparatus comprising a generally cylindrical vessel having a generally vertically extending axis, a sewage inlet pipe, and an outlet pipe whose mouth lies on the desired sewage level in the vessel and through which purified water is arranged to flow out of said vessel, said vessel being divided into an upper and a lower chamber by means of an insert mounted in said vessel, said insert having the form of a frusto-conical member, the upper portion of which lies above the clean water outlet pipe and the lower portion of which supports against the inner walls of the vessel, and wherein the mouth of the outlet pipe is located in a chamber defined by the upper portion of the insert and a cylindrical member surrounding said insert, the upper edge of said cylindrical member being located above the desired water level and the lower edge of said member being located beneath said level in a manner to form a gap between the insert and the cylindrical member, Different embodiments of apparatus designed for the same function are known in the art. The known apparatus, however, are encumbered with disadvantages which render them unsatisfactory for practical use. For example, those apparatus which are of sufficiently simple construction to enable them to be produced inexpensively are unable to provide the desired degree of purification. On the other hand, those apparatus which are able to purify sewage effectively are so complicated that the cost of manufacturing the same prohibits them from being retailed at a competitive price. Such apparatus also have the disadvantage of being heavy and bulky.

The object of the present invention is to provide an apparatus of the aforementioned type which although of simple construction and inexpensive to produce will purify sewage to a satisfactory degree. Thus, the apparatus of the present invention shall at least substantially circumvent the aforementioned disadvantages found with apparatus of the type envisaged. These objects are achieved with the apparatus of the present invention, which is mainly characterized in that the lower peripheral portion of the insert is supported against the inner walls of the vessel, that a number of openings or recesses are formed adjacent to or at said peripheral surface and that the inlet pipe discharges in the lower chamber at a point located substantially beneath the desired water level so that the sinking contaminants in the sewage flowing from said inlet pipe are deposited on the bottom of the vessel without coming into contact with the gap located between the insert and said cylindrical member and the buoyant contaminants are deposited on the inner surface of the insert facing the bottom of the vessel bottom.

The invention will now be described in more detail with reference to the accompanying drawing, the single FIGURE of which is a vertical, central sectional view through an apparatus constructed in accordance with the invention.

The apparatus illustrated in the drawing comprises a generally cylindrical vessel 1, the axis of which extends generally vertically. The interior of the vessel 1 is divided into two chambers by means of an insert 2 having the form of a frusto-conical member the diameter of which decreases in an upward direction. The insert 2 rests with its lower edge against the inside of the vessel 1 and is held in a determined position relative thereto by suitable means. With the illustrated embodiment of the apparatus, the frusto-conical member is held in position owing to the fact that the diameter of the portion of vessel 1 located beneath the intended position of insert 2 is smaller than the portion of said vessel located above said position, so that a shoulder 3 is formed against which the insert 2 rests. Another conceivable expedient in this respect is to provide a ring around the inside of the vessel 1 against which the insert 2 can rest.

The lower edge of the insert 2 is provided with a number of ports 4 which are arranged to permit water to flow between the loser chamber 5 of the vessel 1 and its upper chamber 6. At its upper edge the insert 2 is provided with a tubular member 7 which forms an upward continuation of the insert 2 and which is open at both ends thereof. Arranged around the tubular member 7 is a tubular sleeve 8. The sleeve 8 is located at a certain distance from the tubular member 7 and is connected at its upper end to said member 7, while the lower end of the sleeve 8 is located at a certain distance from the insert 2. In this way there is formed between the sleeve 8 and the tubular member 7 a chamber 9 which is only open downwardly. An inlet pipe 10 is sealing inserted between the wall of the vessel 1 and is arranged to extend within the vessel obliquely downwards toward the centre thereof. The inlet pipe 10 is also sealingly passed through an opening located in the insert 2 and discharges in the lower chamber 5 at a point level with the under edge of the insert 2, at a distance from the centre line of the vessel 1.

An outlet pipe 11 is arranged to extend from the chamber 9 through a sealed opening in the sleeve 8 substantially horizontally through the upper chamber 6 and out through a sealed opening in the wall of vessel 1.

The mode of operation of the apparatus according to the invention is as follows: Sewage is passed through the inlet pipe 10. Falling contaminants are deposited on the bottom of the lower chamber 5 of the vessel 1. As a result of the positioning of the inlet pipe 10, the sewage entering the chamber 5 is distributed without contaminants already deposited on the bottom of the chamber being disturbed thereby. Buoyant contaminants float to the surface and are collected on the inside of the insert 2. The purified water then flows through ports or openings 4, up into the upper chamber 6, where the water is further purified by the fact that residual buoyant contaminants are collected on the surface of the water and sinking contaminants are deposited on the surface of the insert 2. The further purified water then flows into chamber 9 and when the level of the water in said chamber has risen to the under edge of the outlet pipe 11, the cleaned water will flow through said outlet pipe. The illustrated and described apparatus purifies sewage very effectively and is, at the same time, simple and inexpensive to construct and requires but little maintenance. The invention is not restricted to the illustrated and described embodiment, but can be modified within the scope of the following claims.

What is claimed is:

1. An apparatus for separating sinking and buoyant contaminants from sewage, particularly from domestic sewage and the like, said apparatus comprising a substantially cylindrical vessel arranged on a generally vertical axis, a partition of inverted generally frusto-conical shape disposed coaxially in said container intermediate its ends and dividing the same into upper and lower chambers, said partition having the lower edges thereof terminating proximate to the container wall to define therewith peripheral slots communicating between said chambers and its upper end forming a centrally situated upwardly directed opening, a tubular sleeve surrounding the upper end of said partition to define therewith an annular compartment and having its lower end spaced from said partition to admit liquid therein, an outlet pipe for clear effluent communicating at its inner end with the interior of said annular compartment and extending outside said container, said outlet pipe establishing a working liquid level in said container, and a sewage inlet pipe extending into said container with its inner end opening into said lower compartment at a level substantially below said working level to introduce fresh sewage into said container, whereby sinking contaminants collect in said lower chamber directly from said inlet pipe and indirectly by gravitation down the external sloping surface of said partition through said peripheral slots while buoyant contaminants are isolated from said outlet pipe opening by the internal sloping partition surface and said tubular sleeve.

2. The apparatus of claim 1 wherein said partition includes a generally cylindrical extension at its upper small end forming the inner side of said annular compartment.

3. An apparatus according to claim 1 wherein the partition is supported by a shoulder arranged on the wall of the container.

4. An apparatus according to claim 1 wherein the inlet pipe discharges in the lower chamber at a position substantially level with the lower peripheral edge of the partition and spaced from the centre line of the container in a direction obliquely downwardly towards the same.

* * * * *